US012210506B2

(12) United States Patent
Bentley

(10) Patent No.: US 12,210,506 B2
(45) Date of Patent: Jan. 28, 2025

(54) SERVERLESS CODE SERVICE

(71) Applicant: Bentley Systems, Incorporated, Exton, PA (US)

(72) Inventor: Keith A. Bentley, Elverson, PA (US)

(73) Assignee: Bentley Systems, Incorporated, Exton, PA (US)

( * ) Notice: Subject to any disclaimer, the term of this patent is extended or adjusted under 35 U.S.C. 154(b) by 57 days.

(21) Appl. No.: 18/076,922

(22) Filed: Dec. 7, 2022

(65) Prior Publication Data
US 2024/0193146 A1     Jun. 13, 2024

(51) Int. Cl.
*G06F 16/22*   (2019.01)
*G06F 9/455*   (2018.01)
(Continued)

(52) U.S. Cl.
CPC ...... *G06F 16/2343* (2019.01); *G06F 9/45558* (2013.01); *G06F 16/2219* (2019.01);
(Continued)

(58) Field of Classification Search
CPC ............. G06F 16/2219; G06F 16/2336; G06F 16/2379; G06F 16/275
See application file for complete search history.

(56) References Cited

U.S. PATENT DOCUMENTS 5,220,674 A    6/1993   Morgan et al.
7,386,797 B1   6/2008   Chatterjee et al.
(Continued)

FOREIGN PATENT DOCUMENTS

AU    2014249680-B2    3/2017
CN       101345659 A   1/2009
(Continued)

OTHER PUBLICATIONS

"Notification of Transmittal of the International Search Report and the Written Opinion of the International Searching Authority, or the Declaration," International Filing Date: May 30, 2023, International Application No. PCT/US2023/023864, Date of Mailing: Sep. 6, 2023, pp. 1-13.

(Continued)

*Primary Examiner* — Brittany N Allen
(74) *Attorney, Agent, or Firm* — Cesari and McKenna, LLP; James A. Blanchette

(57) ABSTRACT

In example embodiments, techniques are described for implementing a code service for managing codes for elements in a digital twin of infrastructure according to an edge computing paradigm. The techniques may use an "edge base," wherein each edge computing device (e.g., a client computing device or VM) executes a code service that maintains a local, periodically-synchronized copy of a portion of a code database for the digital twin. A cloud container of a blob storage service of a cloud datacenter may maintain a master copy of the code database. Read operations by an application on a client computing device may be performed against its as-of-last-synchronization local code database. Write operations by the application may likewise be performed against the local code database, serialized via a write lock maintained in the cloud container that permits only a single client computing device to modify its local code database at a time.

20 Claims, 4 Drawing Sheets

(51) Int. Cl.
*G06F 16/23* (2019.01)
*G06F 16/27* (2019.01)

(52) U.S. Cl.
CPC ...... *G06F 16/2336* (2019.01); *G06F 16/2379* (2019.01); *G06F 16/275* (2019.01); *G06F 2009/45595* (2013.01)

(56) References Cited

U.S. PATENT DOCUMENTS

| | | | |
|---|---|---|---|
| 7,587,467 | B2 | 9/2009 | Hesselink et al. |
| 7,647,614 | B2 | 1/2010 | Krikorian et al. |
| 7,890,390 | B2 | 2/2011 | Cochran et al. |
| 8,139,585 | B1 | 3/2012 | Mangal |
| 8,549,473 | B2 | 10/2013 | Dotan et al. |
| 8,655,757 | B1 | 2/2014 | Wookey et al. |
| 8,856,540 | B1 | 10/2014 | Kirubanandan et al. |
| 8,972,962 | B2 | 3/2015 | Becker et al. |
| 9,521,040 | B2 | 12/2016 | Vergara et al. |
| 9,537,894 | B1 | 1/2017 | Kuscher et al. |
| 10,382,262 | B1* | 8/2019 | Gupta .................. H04L 69/329 |
| 10,482,063 | B2 | 11/2019 | Maturana et al. |
| 10,530,935 | B1 | 1/2020 | Britt et al. |
| 11,064,047 | B1 | 7/2021 | Stegall et al. |
| 11,082,361 | B2* | 8/2021 | Laplanche .......... G06F 9/45558 |
| 11,138,529 | B2 | 10/2021 | Bentley et al. |
| 11,347,555 | B2 | 5/2022 | Lee et al. |
| 11,425,054 | B1* | 8/2022 | Dunsmore ............ H04L 47/828 |
| 11,425,187 | B2 | 8/2022 | Sodagar |
| 11,558,251 | B1 | 1/2023 | Luthra et al. |
| 11,762,850 | B2* | 9/2023 | Rupprecht .......... H04L 67/1097 707/769 |
| 2004/0261076 | A1 | 12/2004 | Kondo |
| 2007/0143357 | A1 | 6/2007 | Chaudhri |
| 2007/0294711 | A1 | 12/2007 | Modi |
| 2008/0306976 | A1 | 12/2008 | Agbeblewu et al. |
| 2010/0131470 | A1 | 5/2010 | Schmidt |
| 2012/0197973 | A1 | 8/2012 | Tukol et al. |
| 2013/0067388 | A1 | 3/2013 | Celie et al. |
| 2014/0122897 | A1 | 5/2014 | Dodeja et al. |
| 2014/0181274 | A1 | 6/2014 | Bazin et al. |
| 2014/0280484 | A1 | 9/2014 | Klemenz et al. |
| 2015/0088942 | A1 | 3/2015 | Shah |
| 2015/0222517 | A1 | 8/2015 | McLaughlin et al. |
| 2015/0269488 | A1 | 9/2015 | Galali et al. |
| 2015/0319252 | A1 | 11/2015 | Momchilov et al. |
| 2016/0132314 | A1 | 5/2016 | Solsona-Palomar et al. |
| 2016/0179850 | A1 | 6/2016 | Martin et al. |
| 2016/0277530 | A1 | 9/2016 | Jung et al. |
| 2017/0052776 | A1 | 2/2017 | Kotian |
| 2017/0090904 | A1 | 3/2017 | Shida et al. |
| 2017/0123934 | A1 | 5/2017 | Bentley |
| 2017/0171201 | A1 | 6/2017 | Matsugashita |
| 2017/0371895 | A1* | 12/2017 | Shaw, Jr. ............ G06F 16/1844 |
| 2018/0039453 | A1 | 2/2018 | Nakajima et al. |
| 2018/0062956 | A1 | 3/2018 | Schultz et al. |
| 2018/0095739 | A1 | 4/2018 | Baset et al. |
| 2018/0348007 | A1 | 12/2018 | Adachi |
| 2020/0019411 | A1 | 1/2020 | Nadella et al. |
| 2020/0118303 | A1 | 4/2020 | Connelly et al. |
| 2022/0103338 | A1* | 3/2022 | Brooker ................ H04L 9/0631 |
| 2022/0188092 | A1 | 6/2022 | Liu et al. |
| 2022/0197306 | A1 | 6/2022 | Cella et al. |
| 2022/0334725 | A1 | 10/2022 | Mertes et al. |
| 2023/0006890 | A1* | 1/2023 | Allsbrook ............... H04L 41/12 |

FOREIGN PATENT DOCUMENTS

| | | |
|---|---|---|
| CN | 103714186 A | 4/2014 |
| CN | 104484195 A | 4/2015 |
| CN | 105593816 A | 5/2016 |
| CN | 106406846 A | 2/2017 |
| CN | 107690615 A | 2/2018 |
| CN | 107844352 A | 3/2018 |
| CN | 109343907 A | 2/2019 |
| CN | 105637481 B | 12/2019 |
| CN | 106406846 B | 2/2020 |
| CN | 111158788 A | 5/2020 |
| CN | 113692309 A | 11/2021 |
| CN | 113710339 A | 11/2021 |
| CN | 114116064 A | 3/2022 |
| EP | 3401806 A1 | 11/2018 |
| JP | 2522898 B2 | 8/1996 |
| JP | 2013186518 A | 9/2013 |
| JP | 2018511880 A | 4/2018 |
| JP | 2020102149 A | 7/2020 |
| JP | 2022036800 A | 3/2022 |
| KR | 20220061926 A | 5/2022 |
| WO | WO-2014/042687 A1 | 3/2014 |
| WO | WO-2019037416 A1 | 2/2019 |
| WO | WO-2021069905 A1 | 4/2021 |
| WO | WO-2022/016102 A1 | 1/2022 |
| WO | WO-2022/221719 A2 | 10/2022 |

OTHER PUBLICATIONS

"Invitation to Pay Additional Fees & Where Applicable Protest Fee," International Filing Date: Jun. 21, 2018, International Application No. PCT/US2018/038748, Applicant: Bentley Systems, Incorporated, Date of Mailing: Oct. 29, 2018, pp. 1-14.
"Notification of Transmittal of the International Search Report and the Written Opinion of the International Searching Authority, or the Declaration," International Filing Date: Jun. 21, 2018, International Application No. PCT/US2018/038748, Applicant: Bentley Systems, Incorporated, Date of Mailing: Feb. 19, 2019, pp. 1-22.
U.S. Appl. No. 15/080,858, filed: Mar. 25, 2016 by Keith A. Bentley et al. for Techniques for Conversion of CAD Descriptions, pp. 1-52.
U.S. Appl. No. 17/869,214, filed: Jul. 20, 2022 by Keith A. Bentley for Workspace Databases, pp. 1-28.
"Bentley Building Application Deployment Guide: ProjectWise Managed Workspaces," Bentley Systems, Incorporated, Bentley Building Development Guide, ProjectWise Managed Workspace, Version 1.1, v8i (SELECTseries 1) release, Nov. 2009, pp. 1-38.
"Dynamic Managed Workspace: Dynamic Managed Workspace Introduction," Bentley Systems, Incorporated, Bentley Communities, ProjectWise, ProjectWise Design Integration Wiki, Oct. 5, 2021, pp. 1-4.
"Workspaces," Bentley Systems, Incorporated, ProjectWise Administrator Online Help, Nov. 4, 2021, pp. 1-51.
U.S. Appl. No. 18/097,951, filed: Jan. 17, 2023 by Keith A. Bentley for Serverless Property Store, pp. 1-27.
"Notification of Transmittal of the International Search Report and the Written Opinion of the International Searching Authority, or the Declaration," International Filing Date: Jan. 16, 2024, International Application No. PCT/US2024/011637, Date of Mailing: May 24, 2024, pp. 1-14.
"Notification of Transmittal of the International Search Report and the Written Opinion of the International Searching Authority, or the Declaration," International Filing Date: Dec. 5, 2023, International Application No. PCT/US2023/082557, Date of Mailing: Feb. 27, 2024, pp. 1-15.

* cited by examiner

SERVERLESS CODE SERVICE

BACKGROUND

Technical Field

The present disclosure relates generally to digital twins of infrastructure, and more specifically to a serverless service for maintaining uniqueness of codes within a digital twin of infrastructure.

Background Information

Throughout the design, construction, and operation of infrastructure (e.g., buildings, factories, roads, railways, utility networks, etc.) it is often desirable to create digital twins. Digital twins may federate together data, breaking down product/disciple/phase data silos, to produce unified digital representations usable across the lifecycle of infrastructure. Portions of digital twins are often persisted in infrastructure models, which describe entities in the physical world using corresponding elements in the digital world. Codes may play an integral role in forming a connection between these entities in the physical world and the elements in the digital world.

Often entities in the physical world have a human-understandable identifier such as a manufacture's serial number, asset tracking number, door number, room number, etc. As used herein, a "code" refers to a record that includes a human-understandable identifier of an entity in the physical world, and potentially other information. To form a connection between an entity in the physical world and an element in the digital world, a code (and its human-understandable identifier) may be associated with a machine-readable identifier (such as a globally unique identifier (GUID)). Through a series of these connections, infrastructure in the physical world is linked to its digital twin in the digital world. However, for such connections to be meaningful, it may be necessary to ensure that codes are unique over a given scope (e.g., the scope of the digital twin).

A code service may be employed to maintain an index of all codes available for use within a digital twin and to enforce their uniqueness over a scope. The codes in a code service may originate from an external coding system (such as an enterprise resource planning (ERP) system) or from infrastructure models that persist the digital twin. The code service need not be responsible for creating or validating new codes and may simply record them and enforce that they are unique within the digital twin.

Typically, a code service for a digital twin is implemented using an enterprise code database on a server deployed on-premises or in the cloud via platform as a service (PaaS). However, deployment using an on-premises server or PaaS server suffers many drawbacks. For example, such deployments lack scalability, and may be unreliable. No matter how large the server, a single instance may never be able to scale to handle all requests from all clients of all digital twins in all the world. Likewise, a single server presents a single-point-of-failure. Further, such deployments may be expensive to implement. Enterprise databases are resource-hungry, requiring fast processors, many levels of caching and large memory profiles, which are typically available only at high cost. Additionally, where the enterprise code database is implemented as a "multi-tenant" database to address spin up/spin down overhead, there may be challenges related to security (ensuring clients may only access their own data) and data residency (guaranteeing data resides within a particular geographical boundary). Still further, it may be burdensome to ensure transactional consistency with traditional solutions. Since an enterprise code database is a shared resource, the server typically batches additions, deletions and modification, and pages reads, to provide equitable balancing, leading to transactions of clients becoming intermingled. Maintaining transactional consistency with many intermingled transactions may be complicated and adversely affect performance. It should be understood that there may be a wide variety of additional drawbacks of server-based deployments of a code service (either on-premises or PaaS).

Accordingly, there is a need for improved techniques for implementing a code service for managing codes for elements in a digital twin of infrastructure.

SUMMARY

In various example embodiments, techniques are described for implementing a code service for managing codes for elements in a digital twin of infrastructure according to an edge computing paradigm. Rather than use an enterprise code database on a server, the techniques may use an "edge base," wherein each edge computing device (e.g., a client computing device or virtual machine (VM)) executes a code service that maintains a local, periodically-synchronized copy of a portion of a code database for the digital twin (referred to herein as a "code index database"). A cloud container of a blob storage service of a cloud datacenter may maintain a master copy of the code database for the digital twin (referred to herein as a "master code database"). Read operations by an application on a client computing device may be performed against its as-of-last-synchronization code index database. Write operations by the application may likewise be performed against the code index database, however, they may be serialized via a write lock maintained in the cloud container that permits only a single client computing device to modify its code index database at a time.

Such a serverless code service may provide improved scalability (e.g., since reads never affect reads or writes of applications on other client computing devices, and writes are dependent only on the number of simultaneous writers for the digital twin and not significantly affected by transaction size). Reliability may be improved as there is no single server to fail, reads can sometimes proceed without cloud connectivity (e.g., reads can continue to occur from a code index database even if the master code database is not accessible), and blob storage may support automatic version tracking that can reverse unwanted changes. Further, since blob storage is typically the cheapest offering of a cloud datacenter, cost may be decreased. Spin up/spin down overhead may be limited to the creation and deletion of the cloud container, and data residency may be readily enforced by siting the cloud container in blob storage of a particular geographical region. Still further, transactional consistency may be ensured in a simplified manner without significant performance impacts. It should be understood that there may be a large number of additional advantages of a serverless code service and that this listing merely highlights some of its desirable properties.

In one example embodiment, a serverless code service is provided to manage codes for elements in a digital twin of infrastructure. When a code index database for the digital twin is not already in use on an edge computing device (e.g., a client computing device or VM), the code service obtains a token for accessing a cloud container maintained by a cloud datacenter and downloads a manifest for a master code database maintained in the cloud container to create a local manifest on the edge computing device. Subsequently, upon receiving one or more requests from an application executing on the client computing device to verify a code to be used in the digital twin of infrastructure with an element, the code service downloads from the master code database to the code index database any blocks required to read the code indicated in the local manifest that are not already local in the code index database, reads the code index database, and supplies verification of the code from the code index database to the application.

In another example embodiment, a serverless code service is provided to manage codes for elements in a digital twin of infrastructure. To enable writing, the code service on an edge computing device (e.g., a client computing device or VM) obtains a write lock from a cloud container maintained by a cloud datacenter and downloads a manifest from the cloud container to update a local manifest on the edge computing device. The code service then receives one or more requests from an application to add, delete or modify codes for elements used in the digital twin. The code service downloads any blocks affected by the request that are not already local from the master code database to the code index database. The code service then writes to the code index database to add, delete, or modify one or more blocks of the code index database, and records such additions, deletions, or modifications to create an updated local manifest. Added or modified blocks are uploaded to the master code database, and the updated local manifest uploaded to replace the manifest from the cloud container. Thereafter, the code service releases the write lock back to the cloud container.

In still another example embodiment, an edge computing device (e.g., a client computing device or VM) is configured to manage codes for elements in a digital twin of infrastructure. The edge computing device has a processor and a memory coupled to the processor. The memory is configured to maintain a code index database for storing a portion of a master code database of a cloud container, a local manifest for the code index database produced from a manifest in the cloud container, and software for a code service. The software for the code service when executed on the processor is operable to service one or more requests from an application to verify a code to be used in the digital twin of infrastructure by downloading from the master code database to the code index database any blocks indicated in the local manifest required to read the code that are not already local in the code index database, reading the code index database, and supplying verification for the code from the code index database to the application. The software for the code service is further operable to service one or more requests from the application to add, delete or modify codes for elements used in the digital twin by obtaining a write lock, downloading the manifest from the cloud container to update the local manifest, writing to the code index database to add, delete, or modify one or more blocks of the code index database and recording such additions, deletions, or modifications to create an updated local manifest, uploading added or modified blocks to the master code database and uploading the updated local manifest to replace the manifest in the cloud container, and releasing the write lock back to the cloud container.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
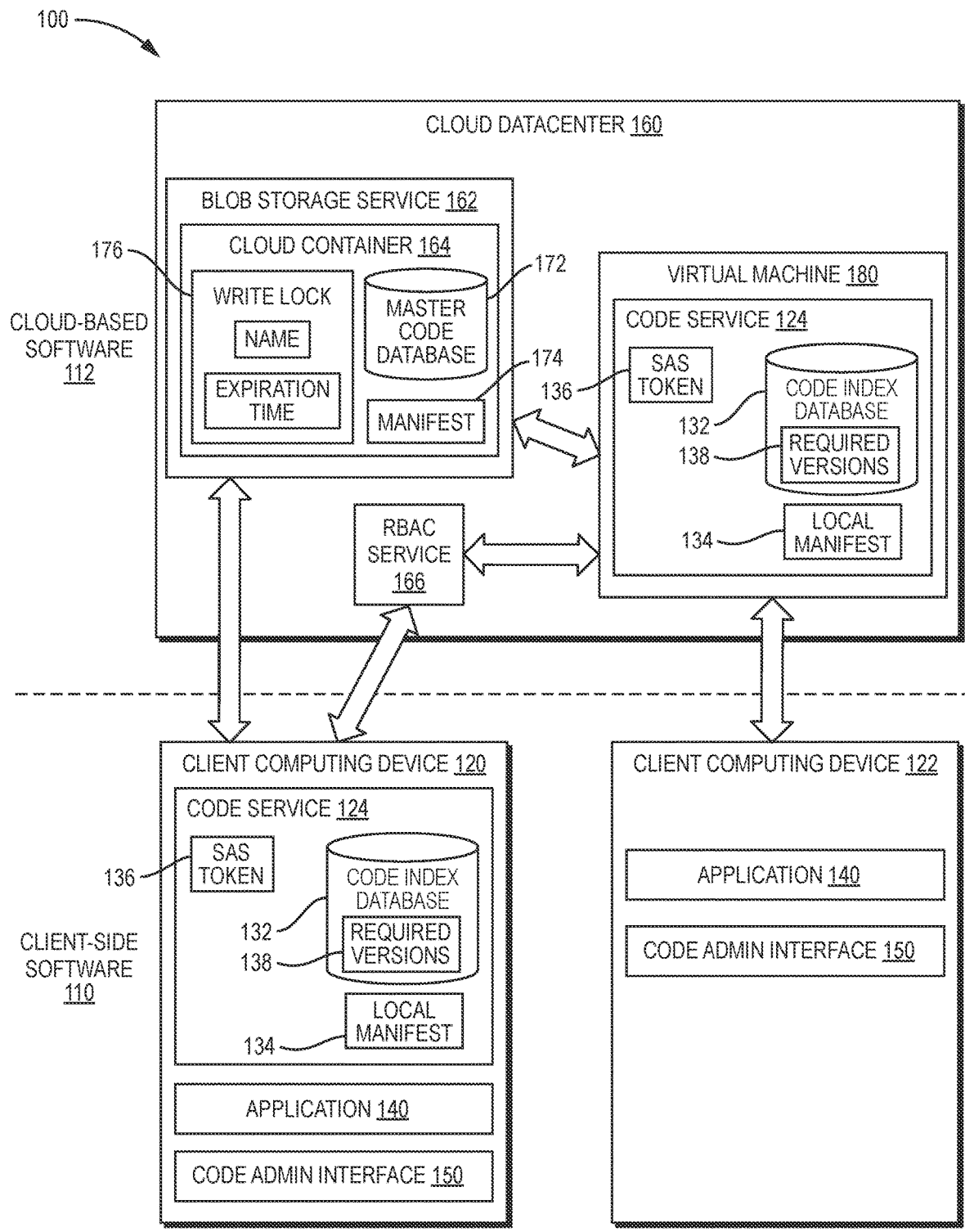
FIG. 1 is a high-level block diagram of an example digital twin software architecture in which a serverless code service may be implemented.

FIG. 1 is a high-level block diagram of an example digital twin software architecture 100 in which a serverless code service may be implemented. The architecture may be divided into client-side software 110 that executes on client computing devices 120, 122 and cloud-based software 112 that executes on a cloud datacenter 160 accessible via a network (e.g., the Internet). Client computing devices 120, 122 may execute an application 140 that utilizes codes to form a connection between entities in the physical world and elements in the digital world of a digital twin of infrastructure. Elements may represent individual units of infrastructure. The connection may be formed by associating a code that includes a human-understandable identifier with a machine-readable code identifier (code ID) that may take the form of a GUID. The cloud datacenter 150 may provide a blob storage service 162 that maintains at least one cloud container 164. There may be a one-to-one correspondence between digital twins and cloud containers, such that each digital twin has its own cloud container 162. The cloud datacenter 150 may also provide a role-based access control (RBAC) service 166 that provides tokens (e.g., shared access signature (SAS) tokens) that grant read and/or write permission to the cloud container 164. In some implementations, the cloud datacenter 150 may additionally provide a compute service for executing one or more VMs 180.

Such an arrangement may be used to provide an "edge base", wherein each edge computing device (e.g., client computing device 120 or VM 180) executes a code service 124 that maintains a local, periodically-synchronized copy of a portion of a code database for a digital twin (i.e. a "code index database") 132, while the cloud container 164 maintains a master copy of the code database for the digital twin (i.e., a "master code database") 172. The master code database may be divided into fixed size portions (e.g., 32 kilobyte (Kb) portions) referred to herein as "blocks" that hold data from a table thereof. An edge computing device may be a client computing device 120 such that the code service 124 and its code index database 132, and the application 140 that utilizes codes, are executed on the same machine, either in a single process or in multiple processes. In such an implementation, the application 140 and the code service 124 may interface directly or via inter-process communication. An edge computing device may also be a VM 180 of the cloud datacenter 160 (or another machine) such that the code service 124 and its code index database 132, and the application 140 that utilizes codes, are executed on separate machines. In such an implementation, the code service 124 may operate as a server that communicates via a web application program interface (API) (e.g., a representational state transfer (REST) API) with the application 140 on the client computing device 122.

In either case, each code service 124 may obtain a token (e.g., a SAS token) 136 from the RBAC service 166 that permits reading and/or writing to the cloud container 164. The cloud container 164 may maintain a manifest 174 indicating block identifier (IDs) of blocks of the master code database 172 (and synchronized code index databases). In one implementation, the block IDs may be a hash of their contents (e.g., a hash of the contents of the 32 Kb portions). Each code service 124 may maintain a local manifest 134 derived from the manifest 174 as it stood at a time of last synchronization. That is, the local manifest 134 may include local changes to the code index database 132 that have not yet been synchronized with the manifest 174, or may lack changes made by other code services to the manifest 174 since a last synchronization. Synchronization may occur independent of block downloads from the master code database 172 or periodic block purging in the cloud container 164.

Read operations for an application 140 on the client computing device 120, 122 are performed by the code service 124 against its code index database 132. Among other functions, read operations may be utilized to verify that a code to-be-used for an element in the digital twin has been reserved in the code index database 132, and to verify (or supply) its code ID. Such verification may be performed when new elements are added to a digital twin, or elements are updated within a digital twin, among other times. Write operations by the application 140 are performed against its local code service's code index database 132, serialized via a write lock 176 (e.g., a specially named blob) maintained in the cloud container 164 that permits only a single client computing device 120, 122 to modify its code service's code index database 132 at a time. A code service 124 may obtain the write lock 176, download the manifest 172 from the cloud container 164 to refresh the local manifest 134, perform write operations on the code index database 132 and update the local manifest, upload added or modified blocks to the master code database 172 and upload the updated local manifest 134 to replace the manifest 174 in the cloud container 164, and then release the write lock 176. The code index database 132 may also hold a required versions property 138 indicating a range in which a version of the application 140 must fall in order to be allowed to read or write to the code index database 134.

In order to configure and manage the arrangement, a code administration interface (e.g., a command line interface (CLI)) 150 may be provided on a client computing device 120, 122. The code administration interface may provide functionality to create the master code database 172, the manifest 174 in the cloud container 164, and the write lock 176; to assign the cloud container 164 to the digital twin; as well as other configuration and management functionality.

Figure 2:
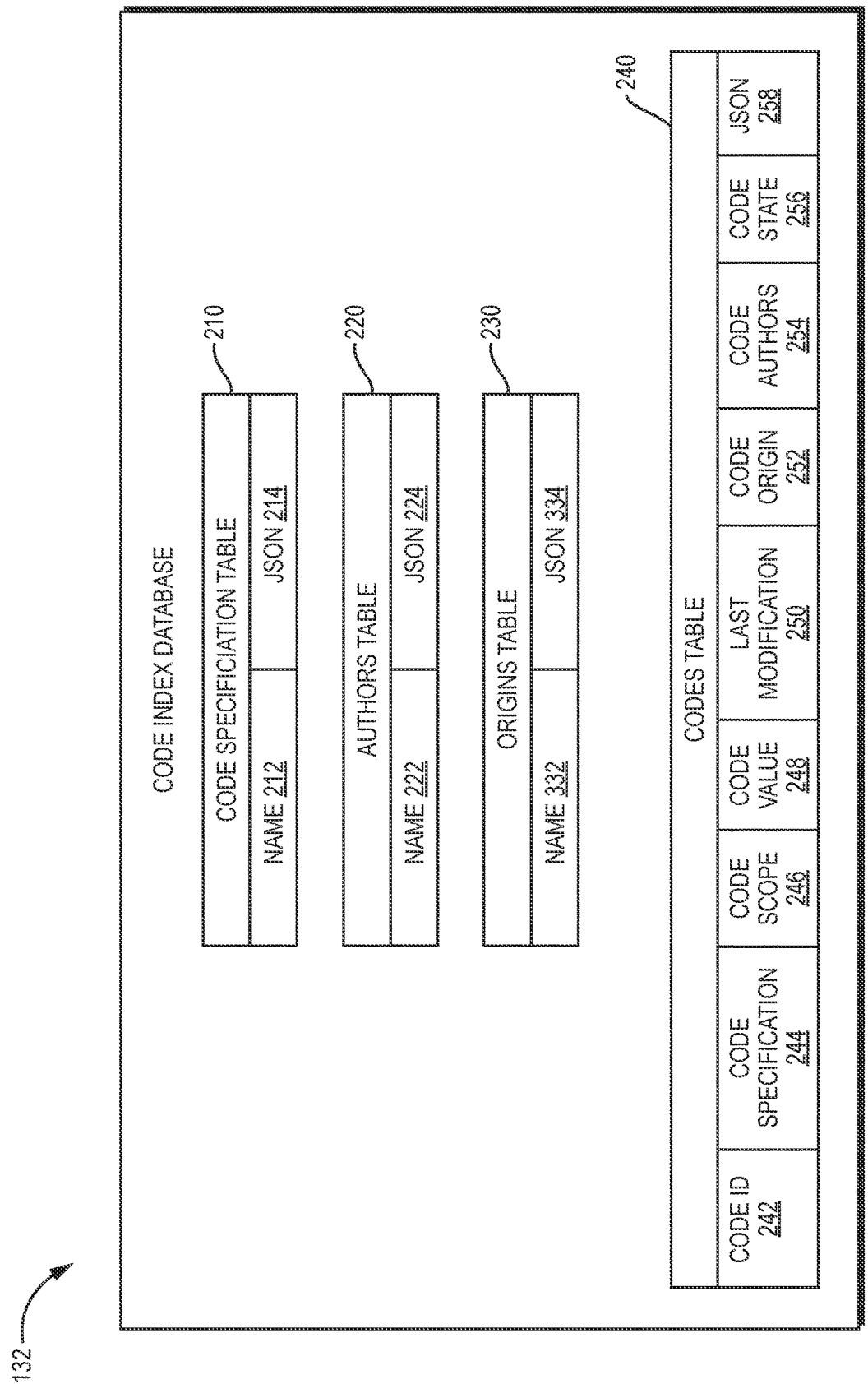
FIG. 2 is a diagram of an example code index database.

FIG. 2 is a diagram of an example code index database 132. In this example, a code is formed from three parts that are concatenated together, namely: a code value part that indicates is human-understandable identifier (e.g., a string with a manufacture's serial number, asset tracking number, door number, room number, etc.), a code scope part that indicates (e.g., with a machine-readable identifier, such as a GUID) a context over which the human-readable string is guaranteed unique (e.g., a building, a floor, a pipe run, etc.), and a code specification part that indicates (e.g., with a string) a type of the code and provides information such as how the code is encoded and decoded, how to determine a next available value in a code sequence, and/or how to further qualify code scope/code value pairs to provide for different purposes.

The code index database 132 may be maintained by a database layer (e.g., a CloudSQLite™ layer) of the code service 124 and structured to hold a number of data tables, including a code specification table 210, an authors table 220, an origins table 230, and a codes table 240. The code specification table 210 may associate code specifications with codes and include a column 212 for code specification name and a column 214 for a string (e.g., a JavaScript Object Notation (JSON) string). The authors table 220 may associate the names of individuals or groups of individuals with codes and include a column 222 for author name and a column 224 for a string (e.g., a JSON string). The origins table 230 may associate the names of code originators with codes. An originator may be an external coding systems (e.g., an ERP system), an infrastructure model or other source. A column 232 of the origins table 230 may include originator name and a column 234 may include a string (e.g., a JSON string). The codes table 240 may associate a machine-readable code ID (e.g., a GUID) with the parts of the codes, as well as other information. The codes table 240 may include a column 242 for code ID, a column 244 for code specification that serves as a foreign key to the code specification table 210, a column 246 for code scope, a column 248 for code value, a column 250 for last modification time, a column 252 for code origin that serves as a foreign key to the code origins table 230, a column 254 for code authors that serves as a foreign key to the code authors table 220, a column 256 for code state that may hold an application-defined value related to the state of the code, and a column 258 for a string (e.g., a JSON string). While not shown in FIG. 2, it should be remembered that the code index database 132 is typically divided into blocks (e.g., 32 Kb blocks), where contents of a block are sourced from one table 210, 220, 230, 240.

Figure 3:
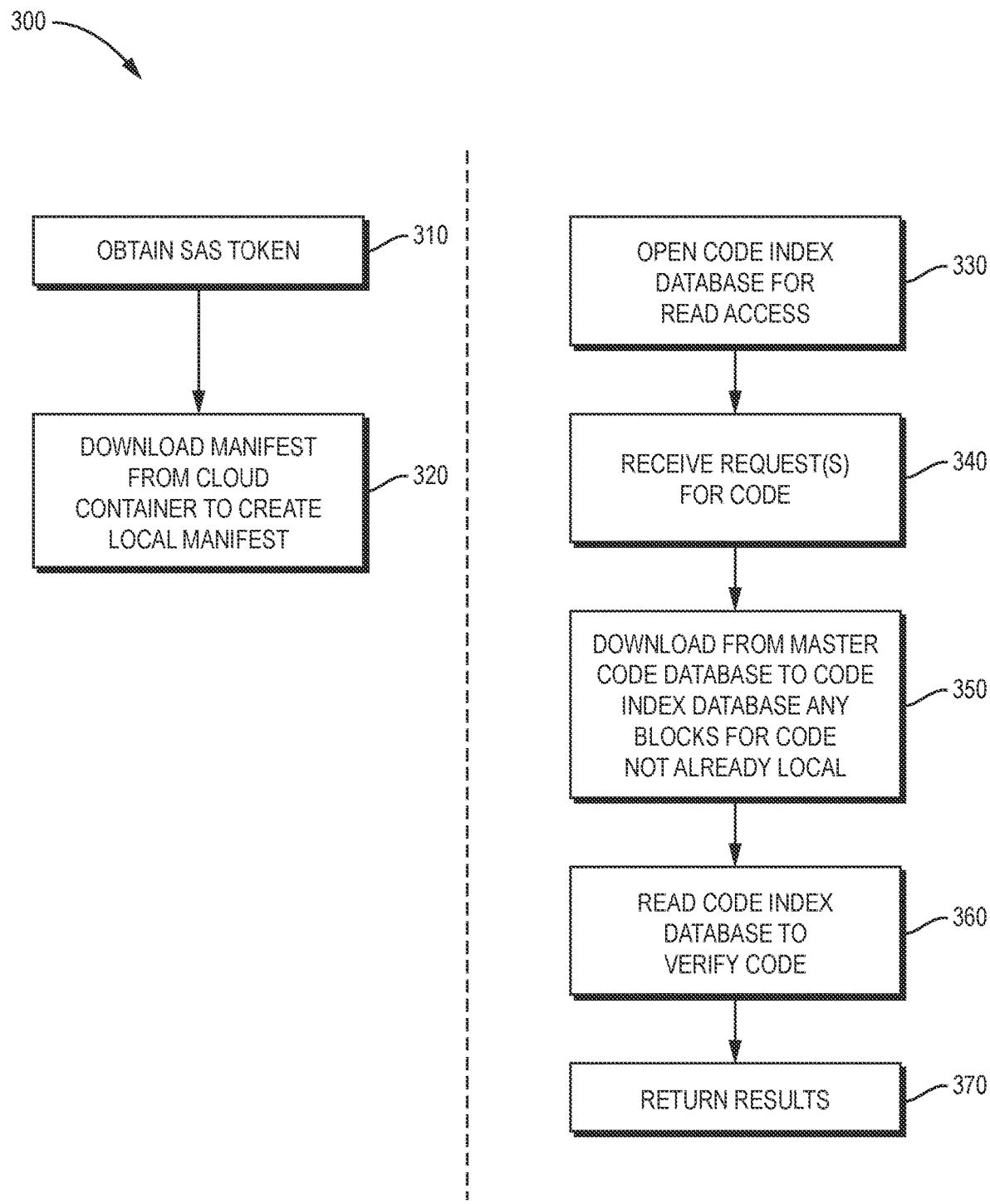
FIG. 3 is a flow diagram for an example sequence of steps for configuring access and performing read operations using a serverless code service.

FIG. 3 is a flow diagram for an example sequence of steps 300 for configuring access and performing read operations using a serverless code service. The sequence of steps 300 may assume a code index database 132 for the digital twin is not already in use on the edge computing device (e.g., client computing device 120 or VM 180). If a code index database 132 is already in use then steps 310-320 may be skipped.

At step 310, the code service 124 may obtain a token (e.g., a SAS token) 136 from the RBAC service 166 that permits reading and/or writing to the cloud container 164. The token may have an expiration time, and the code service 124 (during normal operation) may periodically refresh the token before it expires.

At step 320, the code service 124 may download the manifest 174 from the cloud container 164 to create a local manifest 134 on the edge computing device (e.g., client computing device 120 or VM 180) that includes a list of block IDs. This local manifest 134 will later be periodically (e.g., in response to a timer) or responsively (e.g., in response to a manual request from a user or a trigger, for instance when writes are to occur) refreshed (synchronized) to update it to reflect changes made by other client computing devices. Refreshes may involve redownloading the manifest 174 from the cloud container 164. It should be understood that downloading/redownloading the manifest 174 in and of itself does not cause any blocks of the master code database 172 to be downloaded. Blocks may be separately downloaded (e.g., via prefetching or on demand).

At step 330, which may occur at a subsequent time to step 320, an application 140 may open the code index database 132 for read access. As part of step 330, the code service 124 may verify a version of the application 140 (stored at build time) satisfies the required versions property 138 maintained in the code index database 132 for read access. The required versions property 138 may include two version range specifiers (e.g., semantic versioning specification (SemVer) version range specifiers) that indicate ranges in which the version of the application 140 must fall in order to be allowed to read or write to the code index database 132. Execution may terminate (e.g., an exception may be thrown) if the application 140 is incompatible (either too old or two new). In this manner, the code index database 132 can force users of client computing devices 120, 122 to upgrade their software to an allowable version.

At step 340, the code service 124 may receive one or more requests from the application 140 for a code, for example, to verify a code to be used in a digital twin with an element is reserved in the code index database 132. A request may include a code ID to be verified against the code ID in the code index database 132. If a code ID value is not supplied, the request may seek a code ID to be returned from the code index database 132. The application 140 may issue such requests automatically when new elements are added to the digital twin or elements updated in the digital twin.

At step 350, the code service 124 may download from the master code database 172 to the code index database 132, any blocks indicated by block IDs in the local manifest 134 that are required to read the code but are not already local in the code index database 132. If the needed block(s) are already resident in the code index database 132, then nothing further may need to be downloaded.

At step 360, the code service 124 may read the code index database 132, for example, to verify that the code to be used in the digital twin is reserved in the code index database 132, comparing the code ID if supplied or retrieve a code ID if not supplied.

At step 370, the code service 124 may return results of the verification back to the application 140, either directly (e.g., if they run in the same process on the same client computing device 120), by inter-process communication (e.g., if they run in more than one process on the same client computing device 120) or via the REST API (e.g., if the code service 124 is located on a VM 180).

Figure 4:
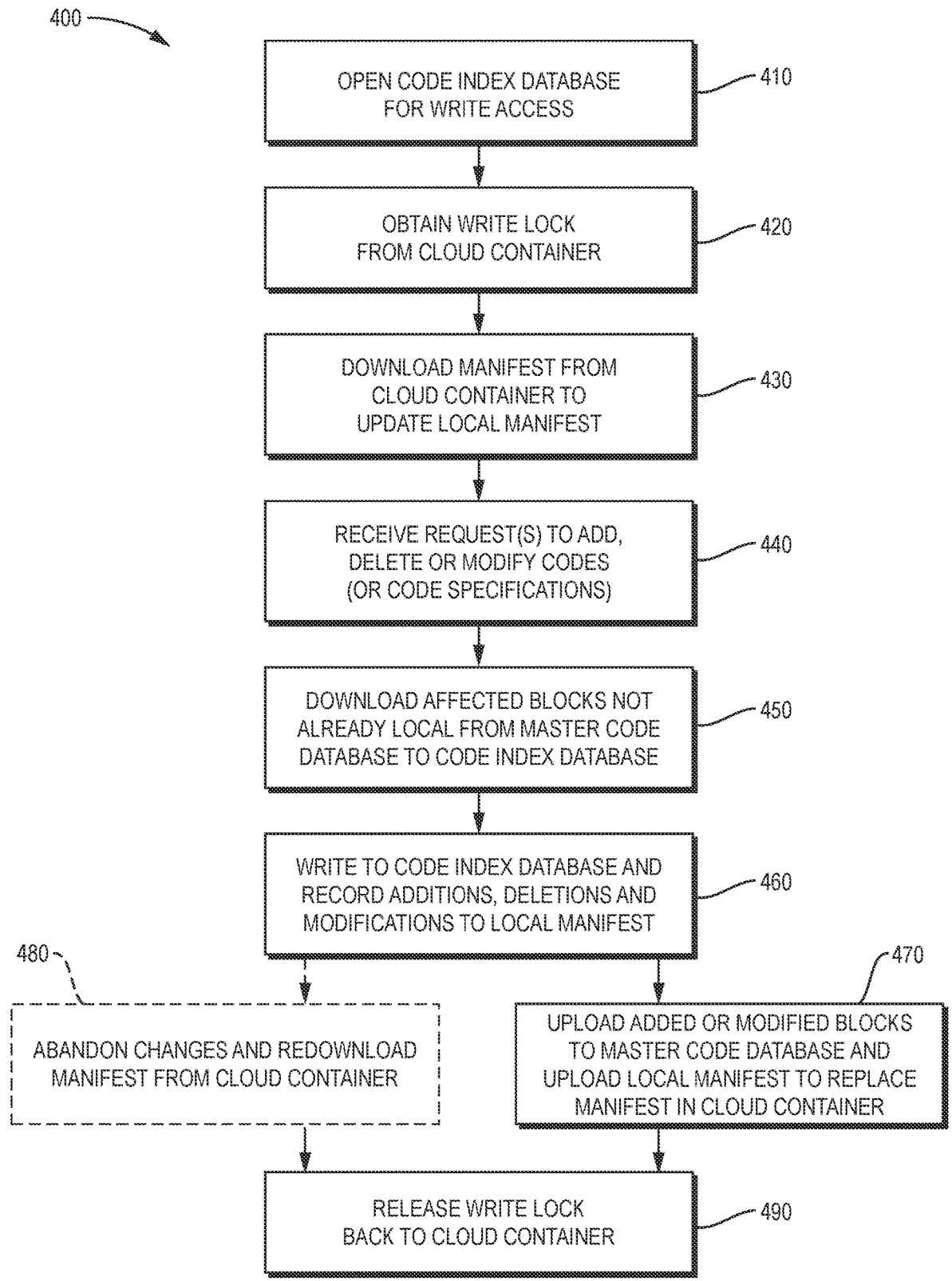
FIG. 4 is a flow diagram for an example sequence of steps for configuring access and performing write operations using a serverless code service.

FIG. 4 is a flow diagram for an example sequence of steps 400 for configuring access and performing write operations using a serverless code service. The sequence of steps 400 may assume a code index database 132 for the digital twin is already in use on an edge computing device (e.g., client computing device 120 or VM 180), for example as a result of performing reads. If a code index database 132 is not already in use, then operations similar to steps 310-320 in FIG. 3 may be performed prior to the steps 400.

At step 410, the application 140 may open the code index database 132 for write access. As part of step 410, the code service 124 may verify a version of the application 140 (stored at build time) satisfies the required versions property 138 maintained in the code index database 132 for write access. Execution of the sequence of steps 400 may terminate (e.g., an exception may be thrown) if the application 140 is incompatible (either too old or two new).

At step 420, the code service 124 may obtain the write lock 176 from the cloud container 164. The write lock 176 may be a specially named blob that holds the name of the client computing device 120, 122 that currently holds write permission, and an expiration time for when it was obtained (e.g., 1 hour from when it was obtained). To obtain the write lock 176, the code service 124 may issue a request (e.g., a Hypertext Transfer Protocol (HTTP) GET request) to read the write lock 176. If the write lock 176 includes a non-null value for name, the expiration time value may be compared with the current time on the client computing device 120, 122 to determine if the write lock 176 is expired (i.e., the current time is past the expiration time value). If the write lock 176 includes a null value for name, or the write lock 176 includes a non-null value for name but is expired, the code service 124 may add the name of the client computing device 120, 122 and set the expiration time to the current time on the client computing device 120, 122 via a request (e.g., an HTTP PUT request with HTTP If-Match). In this manner, if more than one client computing device 120, 122 simultaneously attempts to obtain the write lock 176 only one will succeed. If the write lock 176 includes a non-null value for name and has not expired, the code service 124 may wait a predetermined time-out period and then repeat, issuing another request to read the write lock 176. If the write lock 176 has not been obtained after a predetermined number of attempts, the process may fail.

At step 430, the code service 124 may download the manifest 174 from the cloud container 164 to update a local manifest 134 of the code index database 132 on the edge computing device. This refreshes the local manifest 134 to reflect all changes made by applications 140 on other client computing devices since the local manifest 134 was last updated. Thereafter, writes may safely proceed.

At step 440, the code service 124 may receive one or more requests from an application 140 to add, delete, or modify codes (or code specifications). For example, a request may be to add codes (or code specifications) from an infrastructure model of a digital twin to a code index database 132, add a new code specification to the code index database 132, reserve one or more new codes in the code index database 132, reserve one or more new codes from a code sequence used in the code index database 132, update values of one or more codes in the code index database 132, delete one or more codes from the code index database 132, or perform other tasks. The requests may take the form of database commands (e.g., SQL commands) such as INSERT, UPDATE, DELETE, VACUUM, etc. commands.

At step 450, the code service 124 may automatically download from the master code database 172 to the code index database 132 any blocks affected by the requests that are not already local.

At step 460, the code service 124 may write to the code index database 172 to add, delete, or modify one or more blocks of the code index database 132 and record such additions, deletions, or modifications to the local manifest 134, creating an updated version thereof. All new blocks may be assigned a new ID (e.g., a hash of their content). Likewise, all modified blocks may be assigned a new ID (e.g., a hash of their updated content).

At step 470, the code service 124 may upload the added or modified blocks to the master code database 172, and after all added or modified blocks have been uploaded may upload the updated local manifest 134 to replace the manifest 174 in the cloud container 164. The blocks may be uploaded in parallel, with retries, until all blocks are added to the master code database 172. Typically, the blocks of the master code database 172 are immutable. As such, when modified blocks are uploaded they are stored as new blocks with their own block ID (e.g., determined based on their contents), similar to added blocks. Likewise, blocks of the master code database 172 are typically not deleted independent of periodic purge operations (e.g., that may occur relatively infrequently, such as once per day). As such, old blocks whose block ID is no longer in the manifest 174 in the cloud container 164 may remain available until the next purge operation. An effect of such behavior is that even while block uploads are in progress, code services on other client computing devices can safely read from the master code database 172 and will not see any changes. Even after the blocks are written and the manifest 174 in the cloud container 164 updated, code services on other client computing devices can continue to use their now-stale local manifests, and access old blocks from their local code index database 132 or from the master code database 172 for a period of time. To see the changes, the code services on the other client computing devices may periodically refresh (synchronize) their local manifests or trigger a responsive refresh (e.g., for instance as part of their own writes). After such a refresh, the code services will then cease to utilize old blocks and begin to utilize new blocks created by the changes.

At alternative step 480, the code service 124 may abandon the changes. In such case, the local manifest 134 is refreshed by redownloading the manifest 174 in the cloud container 164. If abandonment occur, then any changes are effectively undone by refreshing the local manifest 134.

At step 490, the code service 124 releases the write lock 176 back to the cloud container 164. The code service 124 may clear the name and expiration time via a request (e.g., an HTTP PUT request). If the code service 124 should fail in some manner and not release the write lock 176, the write lock will eventually expire on its own due to the expiration time value, or may be manually released via the code administration interface (e.g., CLI) 150.

As discussed above, codes to be reserved will often originate from an external coding system (e.g., ERP system) or from infrastructure models. However, some types of codes follow a sequential pattern, such that a next code may be determined by applying a sequencing algorithm (defined by a code sequence). By leveraging code sequences, a code service 124 may determine at least some codes to reserve entirely on an edge computing device.

In one implementation, a code sequence may take the form of a decimal sequence. The decimal sequence may define that the code value part of a code includes decimal digits (with or without leading zeros) incremented by some positive integer between a starting value and an ending value, potentially with prefix and/or suffix strings appended thereto. The decimal sequence may permit, or prohibit, holes (i.e., codes that were previously reserved but returned). Reusing holes in a sequence may avoid the sequence from being prematurely filled (i.e. the next code having decimal digits that exceed the ending value). Given a decimal sequence, a code scope, and a flag the indicates whether reusing holes is permitted, the code service 124 may examine the code value part of all reserved codes, determine the code value part of the next code, and then concatenate that with the code scope and an appropriate specification part to produce a code to be reserved.

Additionally, as discussed above, a code administration interface (e.g., CLI) 150 may be used to configure the serverless code service. The code administration interface 150 may be executed on a client computing device 120, 122 and may support commands to create the master code database 172 in an existing cloud container 164, along with the manifest 174 and the write lock 176. The code administration interface 150 may also support commands to assign the cloud container 164 to the digital twin. The cloud container 164 may be identified (e.g., by account name, container ID, etc.) in a record of an infrastructure model that persists the digital twin. Typically, each infrastructure model may store a record identifying one cloud container 164 that is associated with a code service, yet multiple infrastructure models of the digital twin may identify the same cloud container. The code administration interface 150 may also support commands to add codes (or code specifications) from an infrastructure model of a digital twin to a code index database 132, add, update, or delete codes based on another source (such as a JSON file), perform code queries, extract codes to a destination (e.g., a local file), obtain code statistics, purge unused blocks, vacuum a code index database 132, reset the write lock 176, set required versions 138, as well as for a variety of additional functionality.

In summary, techniques are described herein for implementing a code service for managing codes for elements in a digital twin of infrastructure according to an edge computing paradigm. Such techniques may have a number of advantages. As discussed above, they may provide improved scalability, reliability, lower cost, decreased spin up/spin down overhead, geographical region assurance, and simplified guarantees of transactional consistency. It should be understood that there may be a large number of additional advantages. Further, it should be understood that even in implementations where the edge computing device is a VM 180, such techniques do not recreate the shortcomings of an enterprise database. There may be code services on multiple VMs 180 for a digital twin, avoiding issues such as single points of failure and facilitating scaling. Likewise, the presence of some code services on VMs 180 does not preclude the simultaneous deployment of code services on client computing devices.

It should be understood that a wide variety of adaptations and modifications may be made to the techniques describe herein to suit various implementations and environments. While it is discussed above that many aspects of the techniques may be implemented by specific software processes executing on specific hardware, it should be understood that some or all of the techniques may also be implemented by different software on different hardware. In addition to general-purpose computing devices, the hardware may include specially configured logic circuits and/or other types of hardware components. Above all, it should be understood that the above descriptions are meant to be taken only by way of example.

What is claimed is:

1. A method for managing codes for elements in a digital twin of infrastructure, comprising:
   when a code index database for the digital twin is not already in use on an edge computing device,
   obtaining, by a code service executing on the edge computing device, a token for accessing a cloud container maintained by a cloud datacenter, and
   downloading, by the code service, a manifest for a master code database maintained in the cloud container to create a local manifest on the edge computing device;
   receiving, by the code service, one or more requests for verification, from an application executing on a client computing device, of a code to be used in the digital twin of the infrastructure with an element, wherein the code is a record that includes a human-understandable identifier of an entity in the physical world that is part of the infrastructure;
   downloading, by the code service from the master code database to the code index database, any blocks required to read the code indicated in the local manifest that are not already local in the code index database; reading, by the code service, the code index database; and supplying, by the code service, verification of the code from the code index database to the application.

2. The method of claim 1, further comprising:
refreshing, by the code service, the local manifest to enable the code service to see changes made by other code services to the master code database, the refreshing to redownload the manifest from the cloud container to synchronize the code index database with the master code database.

3. The method of claim 1, wherein the edge computing device is the client computing device, and both the code service and the application are executed on the same client computing device, either in a single process or in multiple processes.

4. The method of claim 1, wherein the edge computing device is a virtual machine (VM) of the cloud datacenter, and the code service operates as a server which communicates via a web application program interface (API) with the application on the client computing device.

5. The method of claim 1, wherein each code includes a code value part indicating a human-readable identifier, a code scope part indicating a context over which the human-readable identifier is guaranteed unique, and a code specification part indicating a type of the code.

6. The method of claim 1, further comprising:
obtaining, by the code service from the cloud container, a write lock;
downloading, by the code service, the manifest from the cloud container to update the local manifest;
receiving, by the code service, one or more requests from the application to add, delete or modify codes;
downloading any blocks affected by the request that are not already local from the master code database to the code index database;
writing, by the code service, to the code index database to add, delete, or modify one or more blocks of the code index database, and recording such additions, deletions, or modifications in the updated local manifest;
uploading, by the code service, added or modified blocks to the master code database, and uploading the updated local manifest to replace the manifest in the cloud container; and
releasing the write lock back to the cloud container.

7. The method of claim 6, further comprising:
assigning each added or modified block a new block identifier (ID) in the updated local manifest,
wherein the uploading the updated local manifest adds the new block IDs to the manifest in the cloud container and removes block IDs of deleted blocks from the manifest in the cloud container.

8. The method of claim 7, further comprising:
maintaining old blocks whose block ID is no longer in the manifest in the cloud container until a purge operation is periodically performed.

9. The method of claim 7, wherein the new block ID is a hash of contents of the added or modified block.

10. The method of claim 6, further comprising;
determining, by the code service, a next code in a code sequence, such that the next code is determined on the edge computing device.

11. The method of claim 10, wherein the next value in the code sequence is a reused hole, wherein the reused hole is a previously reserved value that has been returned to the code index database.

12. The method of claim 1, further comprising:
maintaining in the code index database a required versions property indicating ranges in which a version of the application must fall in order for the application to be allowed to read or write to the code index database.

13. The method of claim 6, further comprising:
creating, in response to input in a code administration interface executing on the client computing device, the master code database, the manifest in the cloud container, and the write lock in the cloud container; and
assigning the cloud container to the digital twin.

14. A method for managing codes for elements in a digital twin of infrastructure, comprising:
obtaining, by a code service executing on an edge computing device from a cloud container maintained by a cloud datacenter, a write lock;
downloading, by the code service, a manifest for a master code database to update a local manifest of a code index database on the edge computing device;
receiving, by the code service, one or more requests from an application to add, delete or modify codes for elements used in the digital twin of the infrastructure, wherein a code is a record that includes a human-understandable identifier of an entity in the physical world that is part of the infrastructure;
downloading any blocks affected by the request that are not already local from the master code database to the code index database;
writing, by the code service, to the code index database to add, delete, or modify one or more blocks of the code index database, and recording such additions, deletions, or modifications to create an updated local manifest;
uploading, by the code service, added or modified blocks to the master code database, and uploading the updated local manifest to replace the manifest in the cloud container; and
releasing the write lock back to the cloud container.

15. The method of claim 14, further comprising:
assigning each added or modified block a new block identifier (ID) in the updated local manifest,
wherein the uploading the updated local manifest adds the new block IDs to the manifest in the cloud container and removes block IDs of deleted blocks from the manifest in the cloud container.

16. The method of claim 15, further comprising:
maintaining old blocks whose block ID is no longer in the manifest in the cloud container until a purge operation is periodically performed.

17. The method of claim 15, wherein the new block ID is a hash of contents of the added or modified block.

18. An edge computing device configured to manage codes for elements in a digital twin of infrastructure, the edge computing device comprising:
a processor;
a memory coupled to the processor, the memory configured to maintain a code index database for storing a portion of a master code database of a cloud container, a local manifest for the code index database produced from a manifest in the cloud container, and software for a code service that when executed on the processor is operable to:
service one or more requests for verification, from an application, of a code to be used in the digital twin of infrastructure, wherein the code is a record that includes a human-understandable identifier of an entity in the physical world that is part of the infrastructure, the service of the one or more requests to include downloading from the master code database to the code index database any blocks indicated in the local manifest that are required to read the code that are not already local in the code index database, reading the code index database, and supplying verification for the code from the code index database to the application; and service one or more requests from the application to add, delete, or modify codes for elements used in the digital twin by obtaining a write lock, downloading the manifest in the cloud container to update the local manifest, writing to the code index database to add, delete, or modify one or more blocks of the code index database and recording such additions, deletions, or modifications to create an updated local manifest, uploading added or modified blocks to the master code database and uploading the updated local manifest to replace the manifest in the cloud container, and releasing the write lock back to the cloud container.

19. The edge computing device of claim 18, wherein the edge computing device is a client computing device, and the memory of the client computing device further maintains software for the application.

20. The edge computing device of claim 18, wherein the edge computing device is a virtual machine (VM) of a cloud datacenter and the software for the code service is operable to communicate via a web application program interface (API) with the application.

* * * * *